United States Patent [19]

Hirano et al.

[11] Patent Number: 5,486,561
[45] Date of Patent: Jan. 23, 1996

[54] POLYPROPYLENE RESIN COMPOSITION

[75] Inventors: Koki Hirano; Ryuichi Ohki; Yutaka Kobayashi, all of Ichihara, Japan

[73] Assignee: Idemitsu Petrochemical Co., Ltd., Tokyo, Japan

[21] Appl. No.: 49,302

[22] Filed: Apr. 21, 1993

[30] Foreign Application Priority Data

Apr. 21, 1992 [JP] Japan .................... 4-100773

[51] Int. Cl.$^6$ .............. C08J 3/00; C08K 5/09; C08L 37/00; C08F 8/00
[52] U.S. Cl. ............ 524/451; 524/288; 524/300; 524/515; 524/516; 524/517; 524/530; 524/531; 525/191; 525/193; 525/203; 525/205; 525/206; 525/207; 525/221; 525/232; 525/240
[58] Field of Search ................ 525/191, 193, 525/203, 205, 206, 207, 221, 232, 240; 524/288, 300, 515, 516, 517, 530, 531, 451

[56] References Cited

U.S. PATENT DOCUMENTS

| | | | |
|---|---|---|---|
| 3,183,202 | 5/1965 | Baird et al. | 260/37 |
| 3,866,288 | 2/1975 | Bernard et al. | 29/195 |
| 4,147,742 | 4/1979 | Castro et al. | 525/6 |
| 4,210,556 | 7/1980 | Castro et al. | 260/897 |
| 4,957,968 | 9/1990 | Adur et al. | 525/74 |
| 5,106,665 | 4/1992 | Akao et al. | 428/36.92 |
| 5,225,483 | 7/1993 | Datta et al. | 524/516 |

FOREIGN PATENT DOCUMENTS

| | | |
|---|---|---|
| 0208330 | 1/1987 | European Pat. Off. . |
| 0429236 | 5/1991 | European Pat. Off. . |
| 0454870 | 11/1991 | European Pat. Off. . |
| 0472978 | 3/1992 | European Pat. Off. . |
| 0481789 | 4/1992 | European Pat. Off. . |
| 1248932 | 8/1967 | Germany . |
| 3310417 | 9/1984 | Germany . |
| 1118324 | 4/1967 | United Kingdom . |

Primary Examiner—Paul R. Michl
Assistant Examiner—Patrick Niland
Attorney, Agent, or Firm—Oblon, Spivak, McClelland, Maier, & Neustadt

[57] ABSTRACT

There is disclosed a polypropylene resin composition which comprises (a) polypropylene; (b) ethylene/α-olefin copolymer elastomer having a specific range of Mooney viscosity; (c) modified polyolefin having a specific functioal group at either or both end thereof; and (d) specific compound such as stearic acid monoglyceride, stearyl diethanolamine, N-diethanol stearylamide and N-diethanol dodecanaeamide. The above composition is excellent in elasticity, peeling strength and recoating properties, can be painted immediately after degreasing without pretreatment with trichloroethane, etc. and is well suited for polypropylene bumper materials to be painted, etc.

6 Claims, 1 Drawing Sheet

POLYPROPYLENE RESIN COMPOSITION

BACKGROUND OF THE INVENTION

1. Field of the Invention

The present invention relates to a polypropylene resin composition. More particularly, it pertains to a polypropylene resin composition excellent in coating properties, peeling strength and elasticity.

2. Description of Related Arts

An automobile bumper has heretofore employed a composition of polypropyelen (PP) with ethylene/propylene rubber (EPR). Since polypropylene is extremely poor in coating properties because of its being devoid of a polar group in the molecular and thus chemically inactive, etching with trichloroethane or the like is indispensable in the case of applying coating to a bumper made of such a composition as mentioned above. In addition, it has heretofore been a general practice to perform etching treatment with trichloroethane as pretreatment in the case of applying coating to a polypropylene-based composite material, needless to repeat such a automobile bumper, for the purpose of developing a practically acceptable coating strength. (Refer to Surface Engineering Practice by Shosaku Yamamoto and Mikio Uchida, 31 (10), 440 (1984))

However, trichloroethane is one of the contributors to environmental destruction such as destruction of the ozone layer and therefore, should be excluded from the etching method using it.

As an alternative to trichloroethane, mention may be made of an aqueous alkali solution of a surfactant, which however has not been usable for applying coating to a polypropylene-based composite material typified by a bumper made thereof because of its extremely poor cleaning dissolving performance.

On the other hand, there is reported a method of improving coating properties by blending a polar substance with PP to form a composition, which is exemplified by a composition of PP resin with polyvinyl phenol (Japanese Patent Application Laid-Open No. 9941/1991) and a composition of PP resin with an ethylene/carboxylic acid compound copolymer (Japanese Patent Application Laid-Open No. 278862/1991). Nevertheless, any of the above-mentioned compounds has not a sufficient adhesiveness in the coating as a bumper material to be coated after cleaning with a water-based cleaning agent.

Under such circumstances, intensive research and investigation were concentrated by the present inventors into the development of a PP resin composition capable of being coated immediately after degreasing and suitable for recoating without pretreatment with a halogen-containing organic solvent such as trichloroethane as well as the elimination of the above-described problems.

As a result, it has been found by the present inventors that a composition of a specific compound that had theretofore been used as an electrifying agent with a modified polyolefin having a functional group introduced therein has excellent coating properties and the use of such composition can attain the object of improving coating properties. The present invention has been accomplished on the basis of the above-mentioned finding and information.

SUMMARY OF THE INVENTION

Specifically, the present invention provides a polypropylene resin composition which comprises 50 to 90% by weight of (a) polypropylene; 50 to 10% by weight of an (b) ethylene/α-olefin copolymer elastomer having a Mooney viscosity of 10 to 100 (ML 1+4 (100° C.)); 0.1 to 15 parts by weight based on 100 parts by weight of (a) and (b) in total of a (c) modified polyolefin formed by introducing a functional group in either or both end/s of the corresponding straight-chain polyolefin; and 0.1 to 1.0 part by weight based on the same of a (d) compound represented by the general formula (I)

$$R-C=O \text{ or } R-X \quad (I)$$

wherein R is a straight chain alkyl group having 10 to 22 carbon atoms and X denotes

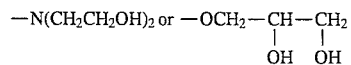

$$-N(CH_2CH_2OH)_2 \text{ or } -OCH_2-CH-CH_2$$
$$\qquad\qquad\qquad\qquad\qquad\quad | \quad\; |$$
$$\qquad\qquad\qquad\qquad\qquad\; OH \;\; OH$$

DESCRIPTION OF PREFERRED EMBODIMENTS

Figure 1A:
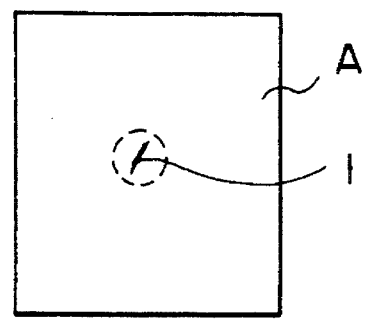
FIGS. 1a–1d are a schematic view showing the evaluation standard of recoating properties in the examples and comparative exmaples wherein the symbols A, B, C and D are each a test piece, the numeral 1 is a cut and the numeral 2 is a crack.
Figure 1B:
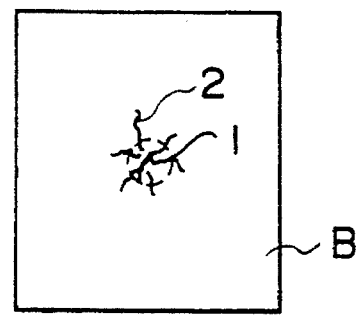
Figure 1C:
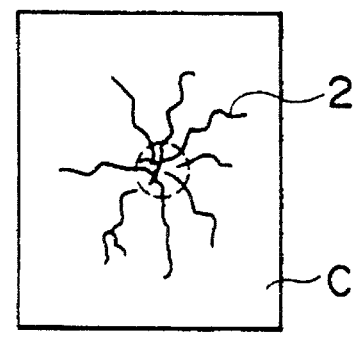
Figure 1D:
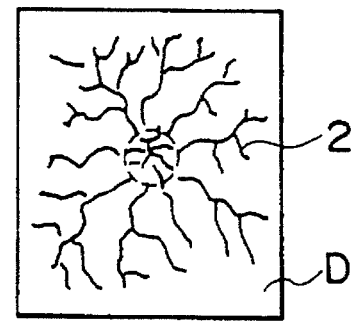

As mentioned above, the polypropylene resin composition according to the present invention comprises the components (a), (b), (c) and (d).

The polypropylene (PP) as the component (a) is not specifically limited but preferably exemplified by crystalline isotactic propylene homopolymer, ethylene/propylene random copolymer with minor content of ethylene unit, ethylene/propylene block copolymer composed of homopolymer blocks consisting of propylene homopolymer and copolymer blocks consisting of ethylene/propylene random copolymer having a relatively high content of ethylene unit and propylene/ethylene/α-olefin crystalline copolymer wherein the homopolymer sequence or the copolymer sequence in the above-mentioned propylene block copolymer is further copolymerized with an α-olefin such as butene-1. The melt index (MI) of the aforesaid PP is not specifically limited but is desirably 0.5 to 100 g/10 min., particularly desirable 1 to 50 g/10 min.

The compounding ratio of the component (a) is 50 to 90%, preferably 60 to 80% by weight based on the total amount of the components (a) and (b). A compounding ratio thereof of less than 50% by weight results in deterioration of the physical properteis such as rigidity of the composition to be produced, whereas that more than 90% by weight leads to failure to attain high adhesion properties of coating.

The ethylene/α-olefin copolymer elastomer as the component (b) is exemplified by a copolymer of ethylene and an α-olefin such as propylene, 1-butene, 1-hexene or the like and a copolymer of the copolymer and a non-conjugated diene. Any of the copolymer is an amorphous or lowly crystalline copolymer which has an initial modulus of elasticity as measured according to JIS K-6301 of desirably 400 kg/cm² or less, more desirably 200 kg/cm² or less, particularly desirably 100 kg/cm² or less. The ethylene content in the copolymer is desirably 40 to 80%, particularly desirably 50 to 75% each by weight. Specific examples of the above-mentioned non-conjugated diene include dicyclopentadiene;

1,4-hexadiene; cyclooctadiene; dicyclooctadiene; methylnorbornene; 5-ethylidene-2-norbornene; 5-vinyl-2-norbornene; 5-methylene-2-norbornene; 5-methyl-1,4-hexdiene; and 7-methyl-1,6-octadiene. The ethylene/α-olefin copolymer elastomer has a Mooney viscosity of usually 10 to 100 (ML 1+4 (100° C.)), preferably 20 to 70 (ML 1+4 (100° C.)).

Specific examples of the aforesaid ethylene/α-olefin copolymer elastomer include ethylene/propylene copolymer rubber (EPM), ethylene/1-butene copolymer rubber, ethylene/propylene/1-butene copolymer rubber, ethylene/propylene/non-conjugated diene copolymer rubber (EPDM), ethylene/1-butene/non-conjugated diene copolymer rubber and ethylene/propylene/1-butene/non-conjugated diene copolymer rubber, of which are particularly desirable ethylene/propylene copolymer rubber, ethylene/propylene/non-conjugated diene terpolymer rubber and ethylene/propylene/butene-1 terpolymer.

The above-mentioned ethylene/propylene copolymer rubber has a propylene content of desirably 20 to 60% by weight and a Mooney visicosity ML 1+4 (100° C.) of desirably 10 to 100, particularly desirably 20 to 70.

The aforesaid ethylene/propylene/non-conjugated diene rubber (EPDM) has an iodine number of 20 or less. The EPDM having an iodine number outside the above range is unsuitable because of its deterioration in coating properties and balance of its physical properties.

The aforementioned ethylene/propylene/butene-1 copolymer rubber has propylene and butene-1 content of preferably 20 to 60% by weight, based on the copolymer and has a MI (230° C., a load of 2.16 kg) of desirably 0.5 to 25 g/10 min. particularly desirably 1 to 20 g/10 min. The content of each of the components is determined by infrared spectroscopy or nuclear magnetic resonance analysis as the conventional methods. The above-mentioned rubber is preferably amorphous substantially but may be crystalline to some extent with a crystallinity of desirably 5% or less, more desirably 4% or less, particularly desirably 3% or less. The rubber is usually in the form of pellet but may be in the form of crumb rubber or pale crepe insofar as the kneading operation is not accompanied with a trouble.

The compounding ratio of the component (b) is 50 to 10%, preferably 20 to 35% by weight based on the total amount of the components (a) and (b). A compounding ratio thereof of less than 10% by weight results in failure to achieve sufficient coating properties of the composition, whereas that more than 50% causes deterioration of physical properties such as rigidity of the composition.

Sufficient coating properties are obtained by the use of the component (b) as described hereinbefore. In addition, it has been proved that recoating properties (wet-on-wet coating properteis) are improved by the use of two types of copolymers which comprises a (i) copolymer rubber having a content of α-olefin unit of 50 to 80% by weight, a Mooney viscosity of 20 to 80 ML 1+4 (100° C.) and a content of α-olefin unit triad of 10 to 30 mol % as determined by $^{13}$C-NMR; and a (ii) copolymer rubber having a content of α-olefin unit of 15 to 50% by weight and a Mooney viscosity of 10 to 90 ML 1+4 (100° C.). The aforesaid composition comprises preferably 20 to 80% by weight of the component (i) and 80 to 20% by weight of the component (ii).

By the term "recoating properties" as used herein is meant that (i) a defect, when made on a coated product, can be repaired by applying coating again to the defect and (ii) coating can be applied repeatedly in order to enhance the design value. A coated product with poor recoating properties is subjected to peeling of the coating from the substrate by a thinner at the time of recoating. The cause for the improved recoating properties due to the combined use of the copolymer rubbers (i) and (ii) as the component (b) is not yet clarified but is presumably due to that, for example when α-olefin unit is propylene unit (P), the triad [PPP] intervenes on the interface between the polypropylene and the copolymer, enhancing the interfacial strength and therefore, the interface is not attacked by a thinner for coating at the time of recoating.

The modified polyolefin as the component (c) is formed by introducing a functional group in either or both end/s of the corresponding straight-chain polyolefin. A variety of types as the component (c) are available and examples of the direct-chain polyolefin which constitutes the modified polyolefin include a homopolymer of a monomer such as ethylene, propylene, butene-1 and butadiene, exemplified by polyethylene, polypropylene, hydrogenated polybutadiene and hydrogenated polyisoprene; and a copolymer of different monomers exemplified by ethylene/propylene copolymer. The number-average molecular weight of the direct-chain polyolefin portion in the modified polyolefin as the component (c) is desirably 1,000 to 10,000 and particularly desirably 2,000 to 6,000. A variety of the functional groups that are introduced in either or both end/s of the straight chain polyolefin are available and exemplified by hydroxyl group, maleic anhydride group (a group derived from maleic anhydride, in the truest sense), an unsaturated carboxylic group such as acrylic acid group and a polar group represented by the general formula

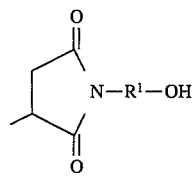

wherein $R^1$ is an alkylene group having 1 to 4 carbon atoms. The preferable functional groups among them are hydroxyl group, maleic anhydride group and the group represented by the general formula. The amount of the functional group to be introduced is not specifically limited, but is usually 1 to 20%, particularly desirably 5 to 10% by weight based on the modified polyolefin. The compounding ratio of the above-described component (c) is 0.1 to 15, preferably 1 to 10 parts by weight based on 100 parts by weight of the total amount of the components (a) and (b). A compounding ratio thereof less than 0.1 part by weight results in failure to give sufficient adhesion properties of coating to the composition obtained, whereas that more than 15 parts by weight causes deterioration of physical properties such as tensile strength and cold impact properteis and also give rise to silver blister at the time of molding because of increase in hygroscopicity of the composition obtained.

The compound represented by the general formula (I) as the component (d) is the compound having both a straight chain alkyl group having 10 to 22 carbon atoms and a substituent represented by X and preferably exemplified by stearic acid monoglyceride, stearyl diethanolamine, N-diethanoi stearylamide and N-diethanol dodecaneamide. The compounding ratio of the above-mentioned component (d) is 0.1 to 1, preferably 0.2 to 0.5 part by weight based on 100 parts by weight of the total amount of the components (a) and (b). A compounding ratio thereof less than 0.1 part by weight leads to failure to give sufficient adhesion properties of coating to the composition obtained, whereas that more than 1 part by weight brings about a defect such as bleedout.

The polypropylene resin composition according to the present invention comprises the components (a) to (d) as the primary components, and may be incorporated, when necessary, with a proper amount of an additive such as heat resistance stabilizer, weatherability stabilizer, antistatic agent, lubricant, slip agent, nucleating agent, flame retardant, pigment, dye, glass fiber, talc, calcium carbonate, carbon fiber, impact resistance improver such as ethylene/α-olefin copolymer elastomer or the like.

The polypropylene resin composition according to the present invention can be produced by the process same as the process for the production of the conventional polypropylene resin composition. The order of adding and blending of the components (a) to (d) and various additives at the time of production may be selected optionally and reasonably. The above-mentioned components can be kneaded by the use of the conventional machinery such as kneader, roll, mixer such as Internal Mixer, single-or-twin screw extruder or the like.

As described hereinbefore, the polypropylene resin composition according to the present invention is excellent in elasticity, peeling strength and recoating properties and further can be subjected to coating immediately after degreasing, dispensing with the pretreatment using a halogen-containing organic solvent such as trichloroethane. Accordingly, it can be effectively utilized for polypropylene bumper materials to be coated, polypropylene resin to be used with coating and so forth.

In the following, the present invention will be described in more detail with reference to the examples and comparative examples, which however, shall not be construed to limit the invention thereto.

Examples 1 to 6 and Comparative Examples 1 to 5

Prescribed amounts of the components (a) to (d) and an additive per each example as listed in Table 1 were fed to a kneading extruder (produced by Nakatani Ko-Ki Co., Ltd., model No. NVC-50φ) and kneaded to prepare a resin composition, which was formed into an injection molded product in the form of square sheet (140 mm×140 mm×3 mm). The coating of the resultant product was carried out by cleaning it with a neutral detergent and then with ion-exchanged water, drying it at 80° C. for 30 minutes, coating with a primer (produced by Nippon Bee Chemical Co., Ltd., model No. RB 123), further spray-coating it with a urethane paint and baking the coated product at 80° C. for 30 minutes.

The adhesive properties of the urethane paint coating on the coated product was evaluated by making a cut of 10 mm width on the coating and measuring a peeling strength at 180° C. with Autograph DSC-2000 (produced by Shimadzu Corporation). The results thus obtained are given in Table 2.

TABLE 1

| | Resin Composition | | | | |
| --- | --- | --- | --- | --- | --- |
| | Component (a) (g) | Component (b) (g) | Component (c) (g) | Component (d) (g) | Additive (g) |
| Example 1 | PP*[1] 62 | EPR-1*[2] 30 | MPP*[4] 2 | SMG*[7] 0.3 | talc*[10] 6 |
| Example 2 | PP*[1] 65 | EPR-2*[3] 20 | MPE*[5] 9 | SDA*[8] 0.8 | talc*[10] 6 |
| Example 3 | PP*[1] 74 | EPR-2*[3] 15 | HPB*[6] 5 | DDA*[9] 0.5 | talc*[10] 6 |
| Example 4 | PP*[1] 64 | EPR-1*[2] 25 | MPP*[4] 5 | DDA*[9] 0.2 | talc*[10] 6 |
| Example 5 | PP*[1] 63 | EPR-2*[3] 30 | MPE*[5] 1 | SDA*[8] 0.7 | talc*[10] 6 |
| Example 6 | PP*[1] 65 | EPR-1*[2] 35 | HPB*[6] 0.5 | SMG*[7] 0.1 | talc*[10] 6 |
| Comparative Example 1 | PP*[1] 64 | EPR-1*[2] 30 | — | DDA*[9] 0.5 | talc*[10] 6 |
| Comparative Example 2 | PP*[1] 71 | EPR-1*[2] 20 | MPP*[4] 3 | — | talc*[10] 6 |
| Comparative Example 3 | PP*[1] 44 | EPR-1*[2] 50 | MPE*[5] 1 | SMG*[7] 0.2 | talc*[10] 6 |
| Comparative Example 4 | PP*[1] 84 | EPR-1*[2] 5 | HPB*[6] 5 | DDA*[9] 0.1 | talc*[10] 6 |
| Comparative Example 5 | PP*[1] 74 | EPR-2*[3] 20 | MPP*[4] 0.05 | SDA*[8] 0.8 | talc*[10] 6 |

*[1]ethylene/propylene block copolymer with MI of 20 g/10 min. at 230° C. and ethylene unit content of 6.3% by weight, produced by Idemitsu Petrochemical Co., Ltd. as model No. J-950H.
*[2]ethylene/propylene rubber with ML 1+4 (100° C.) of 24 and ethylene unit content of 74% by weight, produced by Japan Synthetic Rubber Co., Ltd., as model No. EP02P.
*[3]ethylene/propylene rubber unit ML 1+4 (100° C.) of 27 and ethylene unit content of 50% by weight, produced by Japan Synthetic Rubber Co., Ltd., as model No. EP921.
*[4]maleic anhydride-modified polypropylene with number-average molecular weight of 4000 and maleic anhydride content of 10% by weight
*[5]maleic anhydride-modified polyethylene with number-average molecular weight of 3000 and maleic anhydride content of 5% by weight
*[6]hydrogenated polybutadiene having hydroxyl group at end/s thereof, with number-average molecular weight of 4000, produced by Idemitsu Petrochemical Co., Ltd.
*[7]stearic acid monoglyceride, produced by Marubishi Oil Chemical Co., Ltd. under the tradename Denone 2068
*[8]stearyl diethanolamine, produced by Marubishi Oil Chemical Co., Ltd. under the tradename Denone 2862
*[9]N-diethanol dodecaneamine, produced by Marubishi Oil Chemical Co., Ltd. under the tradename Denone 2863
*[10]talc (Asada talc CT76) produced by Asada Chemical Industry Co., Ltd.

TABLE 2

| | Evaluation of physical properties | |
|---|---|---|
| | Peeling strength (g/cm) | Flexural modulus of elasticity (kg/cm$^2$) |
| Example 1 | >1000 | 9000 |
| Example 2 | >1000 | 9000 |
| Example 3 | >1000 | 10000 |
| Example 4 | >1000 | 10000 |
| Example 5 | >1000 | 8000 |
| Example 6 | >1000 | 8000 |
| Comparative Example 1 | 300 | 9000 |
| Comparative Example 2 | 100 | 10000 |
| Comparative Example 3 | 800 | 4000 |
| Comparative Example 4 | 30 | 11000 |
| Comparative Example 5 | 100 | 1000 |

Examples 7 to 11 and Comparative Examples 6 to 10

Prescribed amounts of the components (a) to (d) and an additive per each examples as listed in Table 3 were fed to a kneading extruder (produced by Nakatani Koaki Co., Ltd., model No. NVC-50φ) and kneaded to prepare a resin composition, which was formed into an injection molded product in the form of square sheet (140 mm×40 mm×3 mm). The coating of the resultant product was carried out by cleaning it with isopropyl alcohol (IPA), coating it with a primer (produced by Nippon Bee Chemical Co., Ltd., model No. RB 123), further spray-coating it with a urethane paint and baking the coated product at 80° C. for 30 minutes.

The adhesive properties of the urethane paint coating on the coated product was evaluated by the following method:

Primary adhesivity 100 numbers of checkers each having 1 mm square were made by notching with a cutter knife so as to reach the substrate inside a square of 10×10 mm. A cellophane self-adhesive tape was firmly attached to the checkers, and then was instantaneously peeled therefrom from one end of the tape so that the peeled part of the tape was at a right angle to the tape remaining on the checkers. The primary adhesivity was evaluated by the peeling state of the checkers on the substrate (n) per 100 numbers checkers as n/100.

Recoating properties

A cut of 10 mm length was made on the coating of a coated test piece so as to reach the substrate with a cutter knife. Subsequently, the primer and urethane paint were applied in turn to the coating in the same manner as above.

As for a test piece with poor recoating properties, peeling from the substrate or blister took place in the form of cracks from the cut as the center. The degree of such peeling or blister was evaluated as shown in Fig., wherein peeling crack was not observed on test piece A (o); observed to some extent on test piece B (Δ); observed considerably on test piece C (x); and observed totally on test piece D (xx), in which the marks in the parenthesises denote the symbol marks for such evaluation. The test pieces marked with o or Δ (A or B) are regarded as being acceptable with respect to recoating properties, while that marked with xx (D) is regarded as being unsuitable for use as a member to be coated.

The results thus obtained are given in Table 4.

TABLE 3

| | Resin Composition | | | | |
|---|---|---|---|---|---|
| | Component (a) (g) | Component (b) (g) | Component (c) (g) | Component (d) (g) | Additive (g) |
| Example 7 | PP*$^1$ 61 | EPR-1*$^2$ 30 | MPP*$^6$ 3 | SMG*$^7$ 0.1 | talc*$^9$ 6 |
| Example 8 | PP*$^1$ 74 | EPR-2*$^3$ 15 | MPP*$^6$ 5 | SMG*$^7$ 0.3 | — |
| Example 9 | PP*$^1$ 66 | EPR-1*$^2$ 25 | HPP*$^6$ 3 | DDA*$^8$ 0.1 | — |
| Example 10 | PP*$^1$ 64 | EPR-1*$^2$ 10 EPR-3*$^4$ 15 | MPP*$^6$ 5 | SMG*$^7$ 0.1 | talc*$^9$ 6 |
| Example 11 | PP*$^1$ 56 | EBM-1*$^5$ 20 EPR-3*$^4$ 10 | MPP*$^6$ 8 | SMG*$^7$ 0.2 | — |
| Comparative Example 6 | PP*$^1$ 69 | EPR-1*$^2$ 25 | — | SMG*$^7$ 0.3 | — |
| Comparative Example 7 | PP*$^1$ 66 | EPR-1*$^2$ 25 | MPP*$^6$ 3 | — | — |
| Comparative Example 8 | PP*$^1$ 63 | EPR-1*$^2$ 30 | — | — | talc*$^9$ 6 |
| Comparative Example 9 | PP*$^1$ 69 | EPR-1*$^2$ 10 EPR-2*$^4$ 15 | — | SMG*$^7$ 0.2 | talc*$^9$ 6 |
| Comparative Example 10 | PP*$^1$ 63 | EPR-2*$^3$ 25 | MPP*$^6$ 0.05 | SMG*$^7$ 0.2 | — |

*$^1$ethylene/propylene block copolymer with MI of 30 g/10 min. at 230° C. and ethylene unit content of 6.5% by weight, produced by Idemitsu Petrochemical Co., Ltd. as model No. J-3050H.

TABLE 3-continued

Resin Composition

| Component (a) (g) | Component (b) (g) | Component (c) (g) | Component (d) (g) | Additive (g) |
| --- | --- | --- | --- | --- |

*²ethylene/propylene rubber with ML 1+4 (100° C.) of 24, ethylene unit content of 74% by weight and [PPP] triad component of 0 mol % as the result of evaluation by ¹³C-NMR analysis, produced by Japan Synthetic Rubber Co., Ltd., as model No. EP02P.
*³ethylene/propylene rubber ML 1+4 (100° C.) of 27, ethylene unit content of 50% by weight and [PPP] triad component of 3.5 mol % as the result of evaluation by ¹³C-NMR analysis, produced by Japan Synthetic Rubber Co., Ltd., as model No. EP921.
*⁴ethylene/propylene rubber ML 1+4 (100° C.) of 30, ethylene unit content of 45% by weight and [PPP] triad component of 20 mol % as the result of evaluation by ¹³C-NMR analysis
*⁵ethylene/butene copolymer with MI of 3.5 g/10 min. at 230° C. and butene unit content of 20% by weight
*⁶modified polyolefin with nubmer-average molecular weight of 4,000, polypropylene as main chain and content of the following functional group of 5% by weight

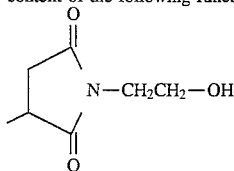

*⁷stearic acid monoglyceride, produced by Marubishi Oil Chemical Co., Ltd. under the tradename Denone 2068
*⁸N-diethanol dodecaneamide, produced by Marubishi Oil Chemical Co., Ltd. under the tradename Denone 2863
*⁹talc (Asada talc CT76) produced by Asada Chemical Industry Co., Ltd.

TABLE 4

|  | Primary adhesivity | Warm-water resistance | Recoating Properties |
| --- | --- | --- | --- |
| Example 7 | 100/100 | 100/100 | Δ |
| Example 8 | 100/100 | 100/100 | Δ |
| Example 9 | 100/100 | 100/100 | Δ |
| Example 10 | 100/100 | 100/100 | ○ |
| Example 11 | 100/100 | 100/100 | ○ |
| Comparative Example 6 | 90/100 | 87/100 | x |
| Comparative Example 7 | 100/100 | 91/100 | x |
| Comparative Example 8 | 93/100 | 90/100 | xx |
| Comparative Example 9 | 97/100 | 79/100 | x |
| Comparative Example 10 | 95/100 | 95/100 | x |

What is claimed is:

1. A polypropylene resin composition consisting essentially of 50 to 90% by weight of (a) polypropylene; 50 to 10% by weight of (b) an ethylene/α-olefin copolymer elastomer having a Mooney viscosity of 10 to 100 (ML 1+4 (100° C.)); 0.1 to 15 parts by weight based on 100 parts by weight of the components (a) and (b) in total of (c) a modified polyolefin formed by introducing a functional group in either or both end of a straight-chain polyolefin having a number-average molecular weight of 1,000 to 10,000, wherein the group is one selected from a hydroxyl group, a maleic anhydride group, an unsaturated carboxylic group and a polar group represented by the general formula

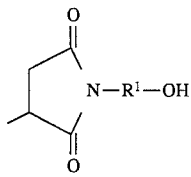

wherein R¹ is an alkylene group having 1 to 4 carbon atoms; and 0.1 to 1.0 part by weight based on 100 parts by weight of the components (a) and (b) in total of (d) a compound represented by the general formula (I)

$$R-C=O \text{ or } R-X \quad \text{(I)}$$
$$\phantom{R-C=O\ or\ R-}X$$

wherein R is a straight chain alkyl group having 10 to 22 carbon atoms and X denotes —N(CH₂CH₂OH)₂ or

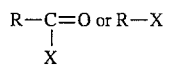

wherein the straight-chain polyolefin has a number average molecular weight of 2,000 to 6,000; and wherein component (d) is selected from the group consisting of stearic acid monoglyceride, stearyl diethanolamine, N-diethanol stearylamide and N-diethanol dodecaneamide.

2. The composition according to claim 1 wherein the functional group introduced in either or both end of a straight-chain polyolefin is selected from a hydroxyl group, an unsaturated carboxylic group and a maleic anhydride group and is introduced in amount of 1 to 20% by weight based on said modified polyolefin.

3. The composition according to claim 1 wherein the functional group introduced in either or both end of a straight-chain polyolefin is a polar group represented by the general formula

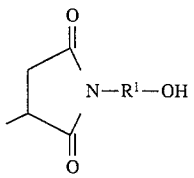

wherein R¹ is an alkylene group having 1 to 4 carbon atoms, and is introduced therein in an amount of 1 to 20% by weight based on said modified polyolefin.

4. The composition according to claim 1 wherein the straight-chain polyolefin is selected from polyethylene, polypropylene, polybutene and hydrogenated polybutadiene.

5. The composition according to claim 1 wherein the polypropylene as the component (a) is an ethylene/propylene block copolymer having a melt index at 230° C. of 1 to 50 g/min.

6. The composition according to claim 1 which further comprises talc as an additive.

* * * * *